April 4, 1967

R. E. SHELHART 3,312,058

FLUID FLOW CONTROL SYSTEM

Filed Sept. 15, 1965

INVENTOR
ROBERT E. SHELHART

BY Stowell & Stowell

ATTORNEYS

April 4, 1967  R. E. SHELHART  3,312,058
FLUID FLOW CONTROL SYSTEM
Filed Sept. 15, 1965  4 Sheets-Sheet 2
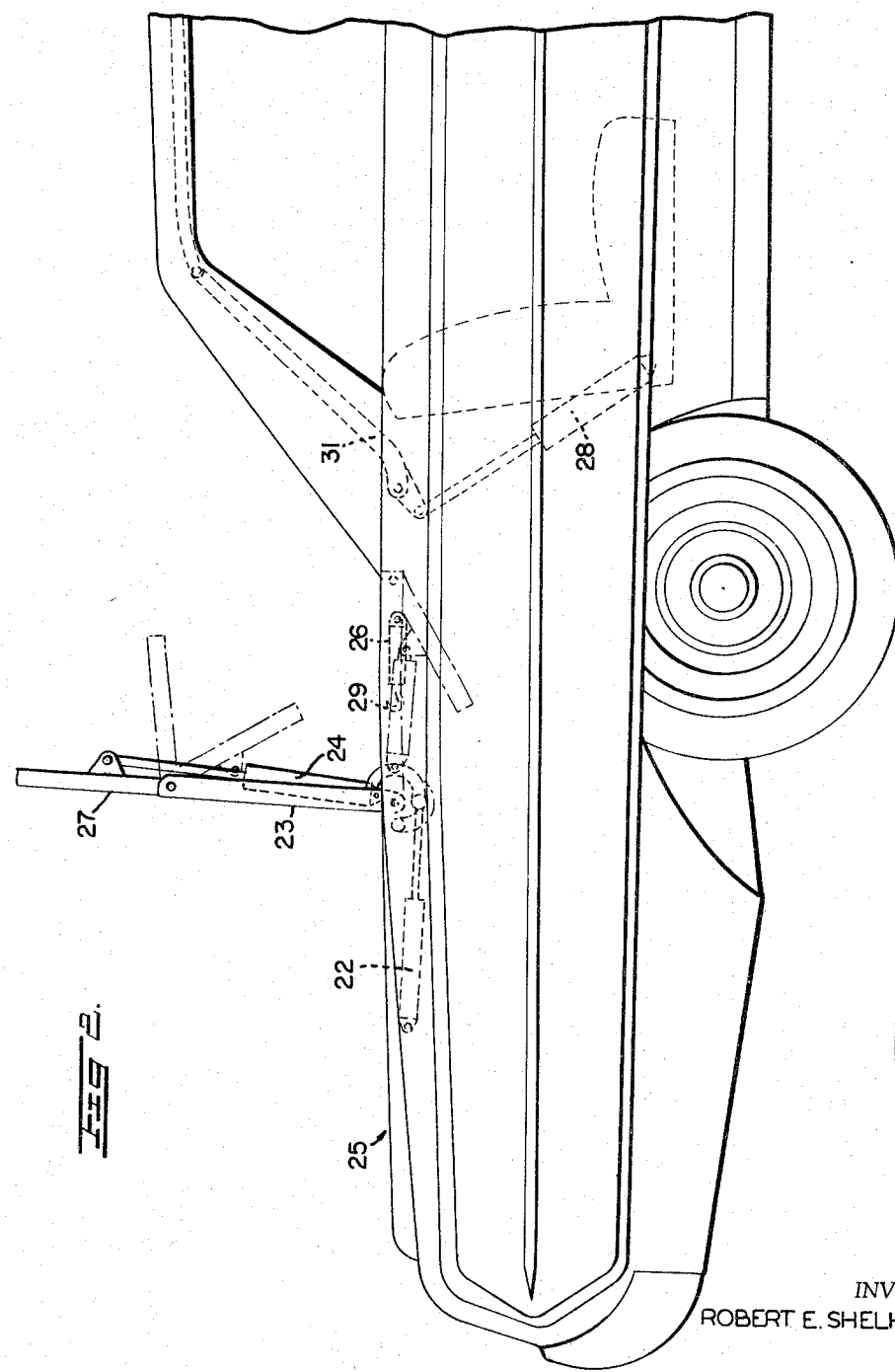
INVENTOR
ROBERT E. SHELHART
BY Stowell & Stowell
ATTORNEYS

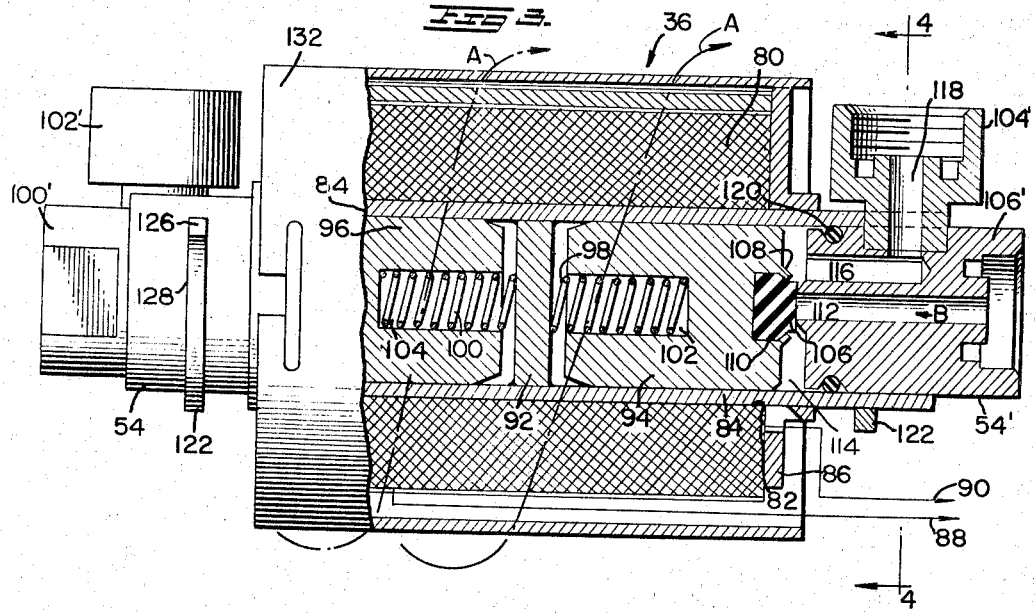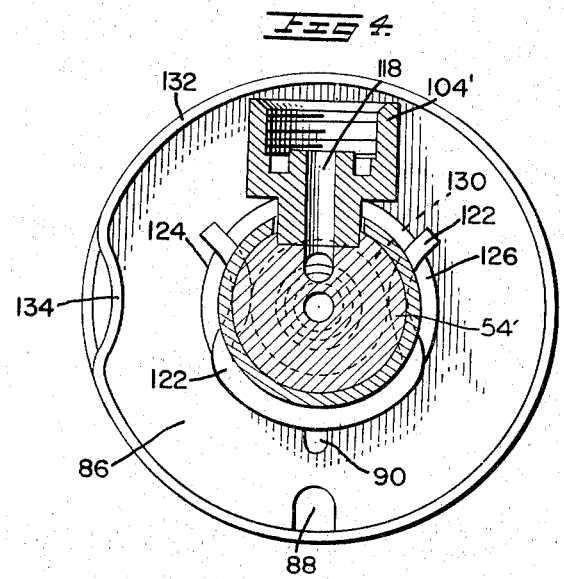

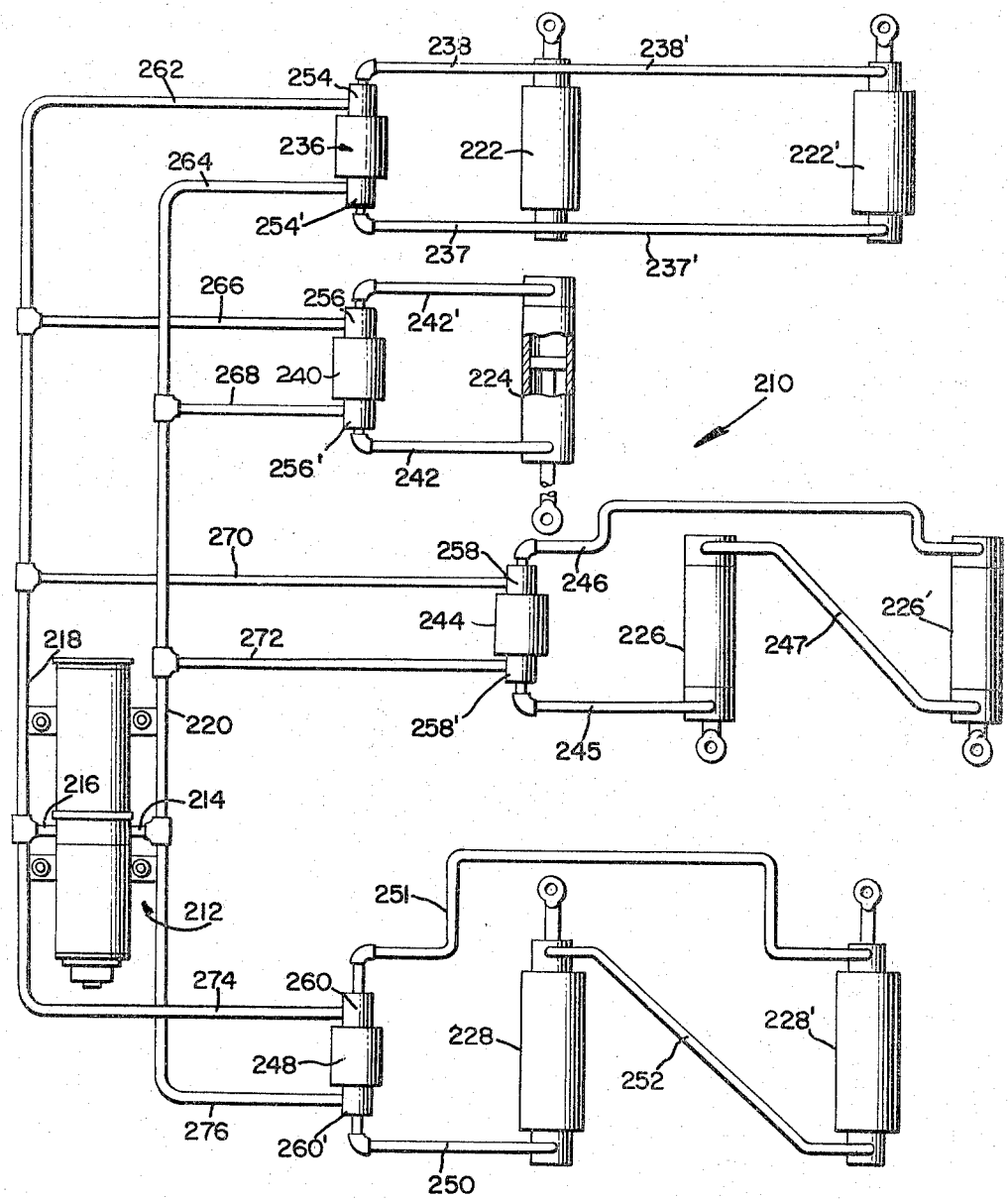

United States Patent Office 3,312,058
Patented Apr. 4, 1967

3,312,058
FLUID FLOW CONTROL SYSTEM
Robert E. Shelhart, Dearborn, Mich., assignor to Dura Corporation, Oak Park, Mich., a corporation of Michigan
Filed Sept. 15, 1965, Ser. No. 487,404
7 Claims. (Cl. 60—52)

This invention relates to fluid flow control systems in general and more particularly to a system wherein a plurality of motion devices are selectively actuated by a single source of pressure fluid through the operation of a plurality of solenoid operated control valves.

Most power operated folding top structures for convertible type automotive vehicles use a hydraulic system which includes several solenoid operated control valves. Such valves operate essentially as other flow control valves but may be activated from remote locations by electrical means. For this and other reasons they are quite expensive. This is particularly so when they are used in the numbers or quantities that are normally required.

Two solenoid operated control valves can be conveniently used to control a pair of hydraulic cylinders connected to the operating mechanism of a top structure. If a power operated boot cover is also used, as with the more expensive luxury cars, a total of eight of these expensive valves may be required. Even considering that a common system could be used for raising and lowering the top and boot cover structures together, a total of four of these valves would seem a minimum that would be needed.

Aside from the number of solenoid valves that may be required in a particular situation, the manner in which the valves operate is important.

Solenoid valves are considered as normally closed or normally open valves depending on whether they open or close a flow passage when they are activated. A spring or unbalanced fluid pressure is most frequently used to hold the valve in its inactivated position and the magnetic coil of the solenoid valve must be strong enough to overcome the resistant forces of which ever is used. This means that certain size coils are required for certain pressure resistant uses and in general actuators for double acting valves can be expected to be twice as large in size.

A further important consideration in pressure liquid flow control systems, and particularly such systems for automotive vehicles, is thermal expansion of the pressure liquid. The design of such systems to prevent system damage upon thermal expansion of the pressure liquid is a particular object of the present invention.

It is another object of this invention to provide a fluid flow control system particularly suited for operating automotive devices such as folding tops of convertibles, windows, trunks, roof and door locks and the like.

Another object of this invention is to provide a fluid flow control system for power operated motion devices which use two or more systems in parallel and which assures separation of the systems.

Another object of this invention is to provide a fluid operating system which includes integral pressure relief means in each of the parallel control means thereof.

It is also an object of this invention to provide an improved solenoid control valve for fluid flow control use and which may serve plural devices with only one actuating coil.

Another object is to provide a dual purpose solenoid control valve which assures separation of different fluid flow systems when used therewith.

A further object of this invention is to provide a plurality of solenoid operated fluid flow control valves wherein excessive fluid pressure is operative of pressure relief means in each valve independent of actuation of the solenoid coil and independent of the other valves of the system.

In general the above and other objects are provided by a pressure liquid flow control system comprising a closed system including a pump and fluid reservoir, fluid inlet and fluid outlet conduit means from said pump, a plurality of pressure fluid operated motion devices, a plurality of dual solenoid operated normally closed flow control valves, a separate pressure fluid and exhaust line connecting one valve of each of the dual flow control valves to one of said input and output conduit means, a further pressure fluid and exhaust line connecting the other valve of each of the dual flow control valves to the other of said input and output conduit means, and a pressure fluid and exhaust line extending from each valve of each dual flow control valve, and means connecting each pair of pressure fluid and exhaust lines from each dual valve to at least one of said plurality of pressure fluid actuated motion devices.

These and other objects and advantages to be gained in the practice of this invention will be better understood and more fully appreciated upon a reading of the following specification and with reference to the accompanying drawings wherein:

FIGURE 2 is a fragmentary view of a convertible vehicle illustrating the mechanisms connected to the fluid pressure system shown in FIGURE 1.

FIGURE 3 is a side and partially cross-sectional view of a single coil double acting solenoid valve of this invention.

FIGURE 4 is a cross-sectional end view of the control valve of the previous drawing figure as seen in the plane of line 4—4 thereon and looking in the direction of the arrows.

FIGURE 5 is a diagrammatic view of a modified fluid flow control system of this invention.

Figure 1:
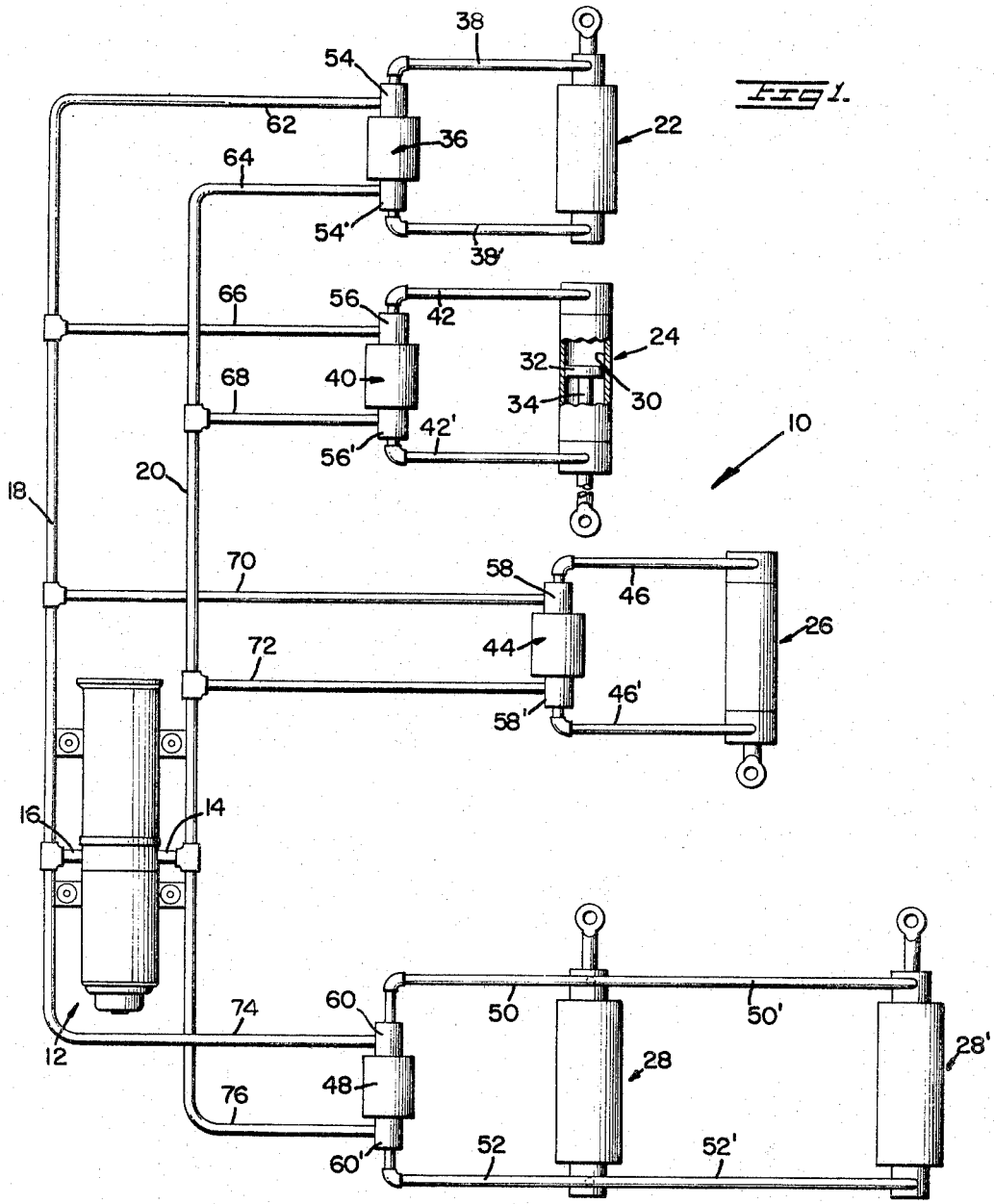
FIGURE 1 is a diagrammatic view of the fluid flow control system of this invention.

Referring to the drawing and particularly to FIGURES 1 and 2 thereof, the flow control system of the invention in generally designated 10 and includes a combination reservoir, and reversible motor and pump unit 12. The inlet and outlet ports 14 and 16 of the pump are connected to pressure fluid inlet and outlet conduit means 18 and 20.

The system includes a plurality of pressure fluid actuated motion devices generally designated 22, 24, 26, 28 and 28'. In the illustrated form of the invention each of the motion devices comprises a double-acting hydraulic ram and as shown in regard to motion device 24 each includes a ram cylinder 30, a ram piston 32, and a ram piston rod 34. While rectilinear acting motion devices are illustrated in the drawings the illustrated motion devices may be replaced by rotary pressure fluid actuated devices.

By way of illustration the motion devices 22, 24, 26, 28, and 28' may perform the following functions:

Motion device 22 may be connected to the deck 23 of a convertible vehicle 25; motion device 24 may be connected to the shelf 27 of the convertible vehicle; motion device 26 may actuate the deck lock 29; and motion devices 28 and 28' may actuate the top raising and lowering elements 31. With such an assembly the following sequence of operation in raising a convertible top from the stowed position may take place. (1) motion device 26 unlocks the lock 29; motion device 22 raises the deck 23; motion devices 28 and 28' raise the top 31; motion device 24 closes the shelf 27, motion device 22, lowers the deck 23 and motion device 26 relocks the deck 23. In stowing the top a different order or sequence of actuation of the motion devices would be required.

Motion device 22 is connected to a dual solenoid actuated valve means generally designated 36 by pressure fluid inlet and return lines 38 and 38'. Similarly, motion device 24 is connected to a dual electrically actuated solenoid valve means 40 by pressure fluid and return lines 42 and 42'; motion device 26 is connected to dual solenoid actuated control valve 44 by pressure fluid inlet and return lines 46 and 46' and motion devices 28 and 28' are connected in parallel to dual solenoid actuated control valve 48 by pressure fluid inlet and return lines 50 and 50', and 52 and 52'.

Solenoid actuated valve means 36 includes flow control valve means 54 and 54' while solenoid actuated flow control valves 40, 44 and 48 have flow control valve means 56, 56', 58, 58', 60 and 60' respectively associated therewith.

Each of the solenoid actuated valve means 36, 40, 44 and 48 is connected to the pressure fluid inlet and return conduit means 18 and 20 in parallel relationship by branch lines 62 and 64; 66 and 68; 70 and 72; and 74 and 76 respectively.

Prior to describing the unique function of the control system of the invention, details of the operation of the novel dual solenoid actuated flow control valve means 36, 40, 44 and 48 will be described with reference to FIGURES 2 and 3 of the drawings.

Referring to FIGURES 3 and 4 illustrating dual solenoid actuated valve means 36, flow control valves 54 and 54' thereof have couplings 100' and 102' which connect to lines 38 and 62 while couplings 104' and 106' connect to flow control lines 64 and 38' illustrated in FIGURE 1 of the drawings.

The fluid flow control valve assembly includes a solenoid coil 80 which has a bore 82 provided centrally therethrough. Within the bore of the coil is a steel sleeve 84 which extends clear through the coil and projects out the opposite ends thereof.

The coil 80 is wound between a pair of end plates 86 welded to the outer surface of the sleeve 84 and the coil includes electrical leads 88 and 90 for electrical actuation of the device. Lead 88 is connected to the positive terminal and lead 90 to the negative terminal of a source of direct current so that current flow is in the direction of directional arrows A when the coil 80 is energized.

A steel disc or separating wall 92 is welded internally of the sleeve 84 midway between the ends thereof. The wall 92 forms a fluid tight barrier within the sleeve and thereby isolates the two valve elements 54 and 54' of the assembly. Also mounted within the sleeve 84 are a pair of steel armatures 94 and 96. The armatures are mounted for reciprocating motion within the sleeve and each is biased outwardly by its helical spring 98 and 100 respectively. The helical springs 98 and 100 are so sized in relation to the valve passages to be closed that normal pressure existing in the pressure fluid lines will not overcome the tension of the spring. Each spring bears at one end against its face of the divider plate 92 and the other end of each bears against the inner end of its internal bore 102–104 provided in each of the movable armatures 94 and 96 respectively.

The outer end of each of the armatures 94 and 96 is adapted to receive a valve seat member 106. Each valve seat member, in the preferred form of the invention, comprises an elastic member secured by flange elements 108 in a recess 110 formed in the outer face of each of the armatures. The opposite face of the resilient valve seat means 106 normally bears against the end of a passage 112 which communicates with the couplings 100' or 106' which in turn receives one end of pressure fluid lines 38 or 38', thereby blocking flow through the passages 112 into the chambers 114 within the sleeve 84. The outlet from each chamber 114 is through a bore 116, which in turn communicates with a bore 118, which in turn communicates with its coupling 102' or 104', having connection to fluid pressure lines 62 or 64. Thus if fluid pressures were flowing in the valve 54' in the direction of direction arrow B flow would be blocked through chamber 114 and passages 116 and 118 in the illustrated position of the armature 94. However, when the coil 80 is energized armature 94 moves towards divider member 92 urging the valve seat 106 from the end of passage 112 whereby the pressure fluid may flow into chamber 114 and out of the valve through passages 116, 118 and pressure fluid line 64.

As hereinbefore discussed, divider wall 92 provides a fluid tight seal with sleeve 84. Valve member 54' which is slidably inserted in its respective end of sleeve 84 is in sealed relationship therewith by the provision of resilient O-ring 120 and the valve element 54' is maintained in its desired relationship to armature 94 by a snap-key or ring 122 which pass through slots 124 and 126 in the extended portion of sleeve 84 and into grooves 128 and 130 shown in FIGURES 3 and 4 of the drawings.

The assembly is finished by providing the coil 80 with an outer jacket 132 which is snapped into place by a portion 134 which is hooked inwardly and engages its corresponding end wall.

The operation of the system and the control valve disclosed will best be understood and appreciated by cross reference between FIGURES 1, 2 and 3 as the sequence of operations is described.

When the motor and pump assembly 12 is operated to supply fluid to the fluid lines 20, 64, 68, 72 and 76 and the valves 36, 40, 44, and 48 are actuated in any desired sequence or combination, fluid passes to fluid flow lines 38', 42', 46', 52 and 52'. In the flow control valves the reciprocal armatures 94 and 96 are both drawn back against the resistance of their respective springs 98 and 100 to provide communications between passageways 118 and 116 and through the chamber area 113 in each of the different valve mechanisms to passage 112.

Fluid under pressure is thus supplied to the hydraulic cylinders 22, 24, 26, 28 and 28' to open the deck, and extend the vehicle top mechanism, etc. The fluid on the opposite sides of the pistons in the respective cylinders flows through lines 38, 42, 46, 50 and 50' past the open valves 54, 56, 58 and 60, and via lines 62, 66, 70 and 74 to conduit 18 and then back to the pump unit 12.

After the vehicle top is up, the control valves are inactivated, the pump 12 is reversed in direction, and the appropriate control valves are activated so that fluid is supplied to the cylinders 22, 24 and 26 to lower the shelf, the deck and to lock the deck. As before, the fluid on the return side of the sytsem is moved back to the then input side of the pump.

It will be appreciated that there is no possibility of cross flow to the flow control valves. Any exchange of fluid will have to occur through a bleed down in the hydraulic cylinder members and such possibility may be guarded against in the usual manner.

It will be particularly noted that the present system is particularly well suited for use in systems which operate under extreme temperature range conditions such as are often found in automotive vehicles. The movable armatures 94, 96, their valve seats 106 and flow lines 112, chamber 114 and passage 116 are so positioned that their connection through the hydraulic ram 22 is through connectors 100' and 106' therefore a thermal buildup of pressure fluid within the hydraulic ram, its conduits or the passages 112 within the valve chambers will be relieved by movement of the respective armatures 94 or 96 toward the divider wall 92 against the tension in springs 98 and 100, whereby the excessive pressure will flow into chamber 114, passages 116 and 118 to the respective conduits 18 or 20, thus preventing damage in the system by thermal expansion. Thermal expansion in the opposite direction, that is, to connectors 102' and 104' of valve 36 need not be relieved by the valve as this relief can be obtained in the pump and reservoir assembly 12. Therefore, it is not necessary to provide a fluid seal engagement between the movable armatures 94 and 96 and the sleeve 84, the pressure of the pressure fluid in chamber 114 is at the same pressure as fluid at the rearward end of each of the movable armatures.

In the form of the invention specifically illustrated in FIGURE 1 the hydraulic rams are either controlled by their own electrically actuated dual valve or plural hydraulic rams are connected to a dual valve in parallel arrangement. Under certain conditions it is desirable to arrange plural actuating cylinders, connected to a dual flow control valve, in series in order to increase the speed of operation of the pistons thereof to maintain the total cycle time to a minimum, and/or to employ such series circuits as a synchronizing means for the plural cylinders. Referring specifically to FIGURE 5 of the drawing, a modified form of the system of the present invention is illustrated wherein certain of the cylinders are in parallel, certain of the cylinders are individually connected to dual flow control valves, and certain of the cylinders are connected through a dual flow control valve means in series arrangement.

In FIGURE 5 the flow control system is generally designated 210 and includes a combination reservoir, and reversible motor and pump unit 212. The inlet and outlet ports 214 and 216 of the pump are connected to pressure fluid inlet and outlet conduit means 218 and 220.

The system includes a plurality of pressure fluid actuated motion devices generally designated 222, 222', 224, 226, 226', 228 and 228'. In the illustrated form of the invention each of the motion devices comprises a double acting hydraulic ram as illustrated with reference to motion device 224. As in the prior form of the invention while rectilinearly acting motion devices are illustrated in the drawing the illustrated motion devices may be replaced in whole or in part by rotary pressure fluid actuated mechanism.

By way of illustration, the motion devices 222, 222', 224, 226, 226', 228 and 228' may be perform the following functions:

Motion devices 222 and 222' may be connected to the deck of a convertible vehicle; motion device 224 may be connected to the shelf of a convertible vehicle; motion devices 226 and 226' may actuate the deck lock; and motion devices 228 and 228' may actuate the top through suitable top raising and lowering linkages.

The sequence of operation and raising of a convertible top, from the stowed position may follow the sequence of operaton described in reference to FIGURE 1 of the drawing.

Motion devices 222 and 222' are connected in parallel to a dual solenoid actuated valve means generally designated 236 by pressure fluid inlet and return lines 237, 237', 238 and 238'. Motion device 224 is connected to a dual electrically actuated solenoid valve means 240 by pressure fluid and return lines 242 and 242'; motion devices 226 and 226', are connected in series to dual solenoid actuated control valve 244 via pressure fluid inlet and return lines 245 and 246, while the upper end of ram cylinder 226 is connected to the lower end of ram cylinder 226' by pressure fluid conduit means 247. Motion devices 228 and 228' are similarly serially connected to dual solenoid actuated flow control valve means 248 by pressure fluid inlet and return lines 250 and 251, while the upper end of ram cylinder 228 is connected to lower end of ram cylinder 228' by pressure fluid conduit means 252.

Solenoid actuated valve means 236 includes flow control valve means 254 and 254', while solenoid actuated flow control valves 240, 244 and 248 have flow control valve means 256, 256', 258, 258', 260 and 260', respectively associated therewith.

Each of the solenoid actuated valve means 236, 240, 244 and 248 is connected to the pressure inlet and return conduit means 218 and 220 in parallel relationship by branch lines 262, 264, 266, 268, 270, 272, 274 and 276, respectively.

With this arrangement of elements actuation of dual flow control valve means 236, while motor and pump unit 212 is functioning, directs pressure fluid to the deck actuating cylinders 222 and 222' in parallel arrangement. Similarly, actuation of dual control valve means 240 directs pressure fluid to either one end or the other of the shelf actuating hydraulic ram 224. Likewise, actuation of dual flow control valve means 244 directs pressure fluid to either one end of hydraulic ram 226 via conduit 245, thence to the lower end of hydraulic ram 226' via conduit 247, while the return fluid is directed from the upper end of ram cylinder 226' via flow control line 246. It will be noted that ram cylinder 226' is actuated by fluid discharging from the upper end of hydraulic ram 226. If reverse operation is desired, by reversing the direction of rotation of pump 212 pressure fluid is first directed to the upper end of hydraulic ram 226' via conduit 246, thence to the upper end of hydraulic ram 226 via conduit 247 connecting the lower end of ram 226' with the upper end of hydraulic ram 226. All of the fluids used to operate rams 226 and 226' is discharged through the flow control valve 258' via conduit 245.

Pressure fluid rams 228 and 228' are serially connected to pressure fluid lines 218 and 220 through flow control valve means 248 in the manner previously described with reference to ram cylinders 226 and 226', whereby actuation of the flow control valve 248, pressure fluid is directed serially through ram cylinders 228 and 228'. Connecting ram cylinders 226, 226' and 228 and 228' in the illustrated serial arrangement decreases the total cycle time of actuation of these devices as only half of the total volume of pressure fluids is required to operate the pair of cylinders serially interconnected then when the hydraulic rams are connected in parallel relationship. Further, by serially interconnecting, for example, hydraulic rams 228 and 228', which are connected to the top actuating linkages, the two cylinders are synchronized in actuation thereby preventing one side rail of the top assembly from getting ahead of the opposite side rail and placing the top linkage in a binding position.

Although preferred forms of this invention have been shown and described in detail, it will be appreciated that certain other modifications and improvements are within the scope of the teachings set forth. Accordingly, such of these improvements and modifications as are not specifically excluded by the language of the hereinafter appended claims are to be considered as inclusive thereunder.

I claim:

1. Fluid flow control means comprising a closed system including a reversible pump and fluid reservoir, fluid inlet and fluid outlet conduit means from said pump, a plurality of pressure fluid operated motion devices, a plurality of dual solenoid operated normally closed flow control valves, a separate pressure fluid and exhaust line connecting one valve of each of the dual flow control valves to one of said input and output conduit means, a further pressure fluid and exhaust line connecting the other valve of each of the dual flow control valves to the other of said input and output conduit means, and a pressure fluid and exhaust line extending from each valve of each dual flow control valve, and means connecting each pair of pressure fluid and exhaust lines from each dual valve to at least one of said plurality of pressure fluid actuated motion devices.

2. The invention defined in claim 1 wherein each of said dual flow control valve means are connected to the fluid inlet and fluid outlet conduit means in parallel relationship and each of said dual flow control valves has connection to at least one motion device.

3. The invention defined in claim 1 wherein said dual control valve means are connected to the fluid inlet and fluid outlet conduit means in parallel relationship and certain of said pressure fluid actuated motion devices are serially connected to their respective flow control valve means.

4. The invention defined in claim 3 wherein other of said pressure fluid actuated motion devices are connected in parallel to their respective dual flow control valve means.

5. The invention defined in claim 1 wherein the solenoid operated normally closed flow control valves are provided with a single solenoid which simultaneously opens each of the dual valves thereof.

6. The invention defined in claim 1 wherein each valve of said dual valve has closure members actuated from a normally closed position to an open position simultaneously by a common solenoid coil.

7. The invention defined in claim 1 wherein each of the plurality of dual solenoid operated normally closed flow control valves comprises a solenoid coil having a bore therein and a sleeve member provided in said bore, said sleeve member being closed at one end and having fluid flow conducting passage means connected at the other end thereof, a pair of passageways provided in said passage means and communicating with each other through said sleeve member, a magnetically responsive member slidably mounted in said sleeve and resilient means biasing said member outwardly in closing engagement with one of said passageways.

No references cited.

EDGAR W. GEOGHEGAN, *Primary Examiner.*